Feb. 25, 1930.   L. AZARRAGA   1,748,379
CAMERA
Filed July 12, 1927

INVENTOR.
LUIS AZARRAGA.
BY W. E. Vaer Jr.
ATTORNEYS.

Patented Feb. 25, 1930

1,748,379

UNITED STATES PATENT OFFICE

LUIS AZARRAGA, OF HEMPSTEAD, NEW YORK

CAMERA

Application filed July 12, 1927. Serial No. 205,076.

My invention relates to improvements in cameras.

The object of the invention is to provide a rotatable hand grip by means of which the camera can be conveniently held and thru the rotation of which, without releasing one's hold, the lens carriage may be racked back and forth for focusing.

Other objects and advantages of the invention will be hereinafter pointed out.

Figure 1:
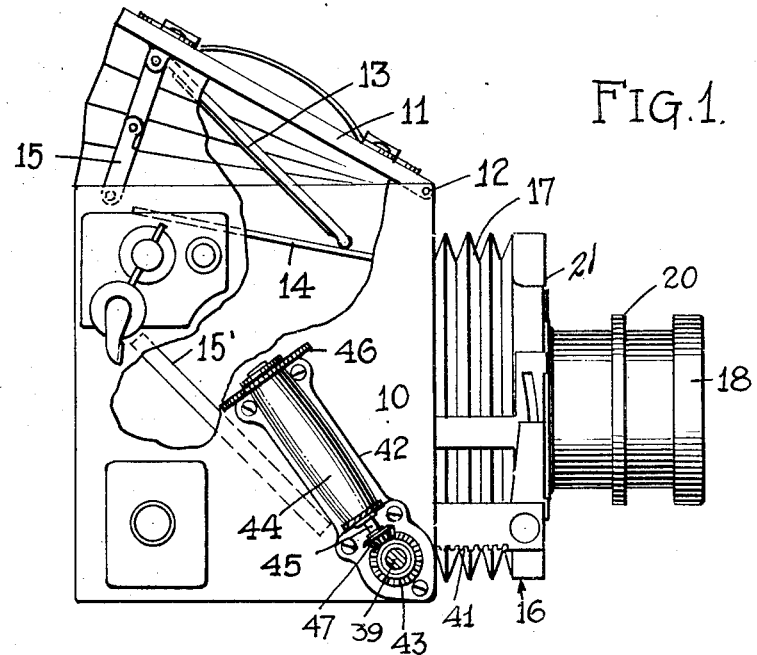
Figure 2:
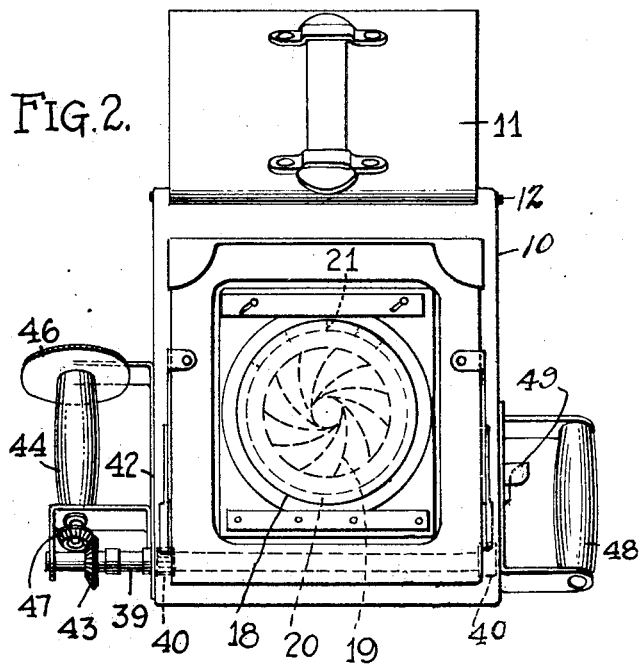

In the drawings, wherein like reference characters denote like or corresponding parts, Fig. 1 is a side elevation of a known type of camera showing the relation between the hand grip and the lens carriage; and Fig. 2 is a front elevation of the apparatus of Fig. 1.

In the embodiment of the invention selected for illustration, a known camera of the reflex type is shown. It comprises a box or casing 10 and a lid or cover 11 hinged thereto as at 12. The ordinary collapsible focusing hood is dispensed with and the cover 11 instead of opening up about an axis extending along the rear edge of said casing, is hinged to open up about an axis extending along the forward casing edge. On its underside said cover 11 has fastened thereto, by any suitable means, a reflecting mirror 13, which, with the cover fully open is adapted to occupy a position at substantially a 45° angle to the ground glass 14. Thus positioned, a proper sight on the object to be photographed can be obtained on a level with the eyes rather than in conformity with the usual practice of bending over and looking down into the extended focusing hood upon the image reflected directly on the ground glass.

Two links 15 hinged to one another and to the casing 10 and cover 11, limit the extent to which the cover may be raised. Consequently, as the cover 11 is fully opened up the mirror 13 swings automatically into the angular position desired. Said mirror 13 is preferably so mounted beneath said cover as to lie flat against it when closed. To reflect the image to the ground glass a second mirror 15', wholly enclosed in the casing 10, is required. This latter mirror 15' and the ground glass 14, however, are both standard camera parts.

The lens carriage of the camera shown is designated in its entirety as 16. Mounted thereon and movable therewith in the usual manner, are such ordinary camera parts as bellows 17, lens 18 and diaphragm 19, the latter (in the camera illustrated) being of the iris type and controlled by a milled ring 20 on which the so-called "f" markings are indicated as at 21. By giving to said ring a fractional turn, the size of the diaphragm opening can be varied.

In lieu of the focusing knob usually provided to rack the lens carriage back and forth, I have provided instead a transverse shaft 39. This shaft 39 is carried through the casing 10 and on the inside of the casing is provided with teeth 40 which are adapted to mesh with rack bars 41 forming a part of the lens carriage frame. Said shaft 39 at one side of the casing is extended therebeyond and at its extended end is journaled in a bracket 42 fastened to the casing side. On said extended end a bevel gear 43 is mounted. The bracket 42 is preferably set at an angle to the vertical and has mounted therein between the top and bottom arms thereof a hand grip 44. This grip 44 is in turn mounted on a shaft 45 journaled in the bracket arms, one end of said grip having formed thereon an operating disc 46 against which the top side of the hand is adapted to bear. The shaft 45 at its lower end has mounted thereon a bevel gear 47 which is adapted to mesh with the bevel gear 43 of the shaft 39. It will be seen, therefore, that by rotating the grip either by turning the hand or by grasping the disc 46, the lens carriage is racked back and forth.

I further provide, on the opposite side of the casing 10, a second hand grip 48. This latter hand grip, however, is fixed or non-rotatable. Its relation to the side of the casing 10 is similar to that of the hand grip 44 and its purpose is that of a second handle by means of which the camera may be held while in use. Preferably said grip 48 is mounted in such proximity to the shutter release 49 as to admit of its being tripped with the thumb of the hand without releasing one's hold.

From the above, taken in connection with the accompanying drawings, it will be noted that the camera may be handled with extreme facility and ease. By shifting the weight of the camera onto the hand holding the hand grip 48, that side of the casing from which the film or plate pack is accessible, is left uppermost and within convenient reach of the then unoccupied hand. The lens carriage moreover may be racked back and forth simply by rotating the hand grip 44.

While I have described my invention in detail in its present preferred embodiment, it will be obivous to those skilled in the art after understanding my invention, that various changes and modifications may be made therein without departing from the spirit or scope thereof. I aim in the appended claims to cover all such modifications and changes.

What I claim is:

1. The combination, in a camera, of a casing, an adjustable lens carriage, a rotatable hand grip, and means operable as said hand grip is rotated to adjust said carriage.

2. The combination, in a camera, of a casing, an adjustable lens carriage, a rack bar fastened to said carriage, a rotatable hand grip mounted at one side of said casing, and means engaging said rack bar and operable as said hand grip is rotated to adjust said carriage.

3. The combination, in a camera, of a casing, an adjustable lens carriage, a bracket fastened to said casing, a rotatable hand grip mounted in said bracket at one side of said casing, a shaft journaled in said casing and rotatable to adjust said carriage, and a geared connection between said hand grip and said shaft.

4. The combination, in a camera, of a casing, an adjustable lens carriage, a rotatable hand grip mounted at one side of said carriage and by means of which the camera can be conveniently held during use, and means operable by and as a result of the rotation of the hand grip, while the camera is so held to adjust said lens carriage.

In testimony whereof I hereunto affix my signature.

LUIS AZARRAGA.